United States Patent [19]

McBrien

[11] Patent Number: 4,736,155

[45] Date of Patent: Apr. 5, 1988

[54] TRANSDUCER TEMPERATURE CONTROL CIRCUIT AND METHOD

[75] Inventor: Gary M. McBrien, Glastonbury, Conn.

[73] Assignee: Colt Industries Inc, New York, N.Y.

[21] Appl. No.: 22,690

[22] Filed: Mar. 6, 1987

[51] Int. Cl.$^4$ .......................... G01L 9/02; H03H 1/00
[52] U.S. Cl. .............. 323/367; 324/DIG. 1; 73/708; 73/719; 73/725
[58] Field of Search ............... 323/364, 365, 367, 369, 323/907; 324/105, DIG. 1; 73/708, 717, 719, 723, 725, 862.63, 862.65

[56] References Cited

U.S. PATENT DOCUMENTS

| | | | |
|---|---|---|---|
| 3,967,188 | 6/1976 | Spencer | 323/367 |
| 4,532,468 | 7/1985 | Nishida et al. | 323/367 |
| 4,535,283 | 8/1985 | Rabinovich et al. | 323/365 |
| 4,556,807 | 12/1985 | Yamada et al. | 323/907 X |
| 4,611,163 | 9/1986 | Madeley | 323/367 |
| 4,667,516 | 5/1987 | Schulz | 323/367 X |

Primary Examiner—Peter S. Wong
Attorney, Agent, or Firm—Richard A. Dornon; Howard S. Reiter

[57] ABSTRACT

An electronic control circuit for a bridge resistance circuit (10) of a transducer (20) has a switchable source of constant magnitude current (22) to direct current pulses of constant amplitude through the bridge circuit. A temperature setpoint detector (24) generates a temperature signal (TA) to a control logic circuit (26) when the circuit attains a predetermined temperature. The control logic circuit periodically turns on the current and directs a sample and hold network (32) to read the transducer output when the predetermined temperature is reached by enabling a gate (30). The control logic circuit turns off the current by applying a signal to the source of current after a reading of transducer output is taken. The current through the transducer develops its output, heats up the transducer and generates the temperature signal.

13 Claims, 5 Drawing Sheets

TRANSDUCER TEMPERATURE CONTROL CIRCUIT AND METHOD

TECHNICAL FIELD

This invention relates to temperature sensitive measuring devices.

BACKGROUND ART

Temperature sensitive measuring devices, such as transducers having resistance elements, may yield erroneous outputs when the temperature of the device is beyond prescribed limits. Presently, the inaccuracies in temperature sensitive measuring devices can be ameliorated by providing external temperature sensitive circuitry to adjust or modulate the output of the devices. Alternatively, an external heating element and associated control circuitry may be supplied to maintain the device at a constant temperature. A prominent drawback associated with either of the aforementioned solutions to the temperature problem is the requirement for an additional component and associated control circuitry. Obviously, the foregoing solutions will increase the complexity and cost of the device and may engender formidable design problems.

DISCLOSURE OF INVENTION

The invention provides a current control circuit to maintain a temperature sensitive measuring device at a relatively constant level when readings are taken therefrom. In contradistinction to the solutions of the prior art, a control circuit of the invention does not mandate the inclusion of temperature sensing or heating elements and is exceedingly simple and inexpensive.

In accordance with the invention, pulses of a constant current are applied to the measuring device until a predetermined temperature is attained whereupon a reading is taken of the parameter measured by the measuring device. A salient feature of a measuring system of the invention is that the measuring device performs a dual function in that it serves as a temperature sensor and a self-heater.

Accordingly, it is a primary object of the invention to provide a control circuit for a temperature sensing measuring device which attempts to take output readings therefrom when the device is at a predetermined temperature.

This and other objects and advantages of the invention will become more readily apparent from the following detailed description when taken in conjunction with the accompanying drawings, in which:

BEST MODE OF CARRYING OUT THE INVENTION

Figure 1:
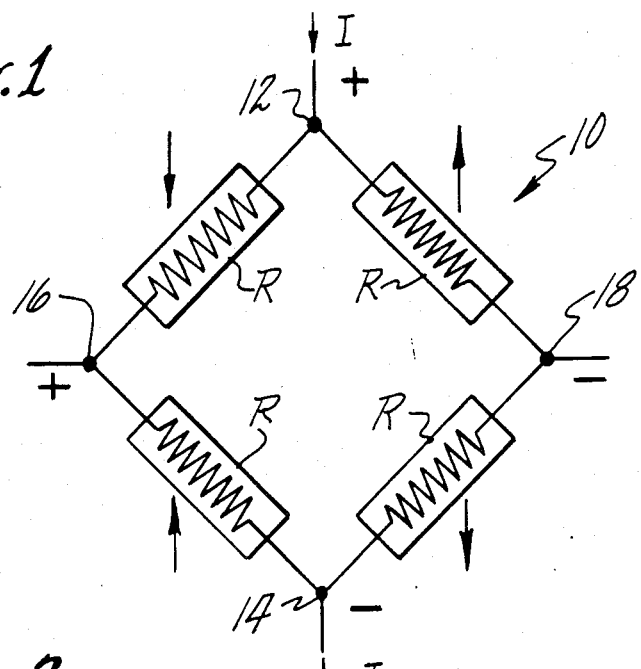
FIG. 1 is a schematic diagram of a resistance bridge circuit in a pressure transducer.

Referring to FIG. 1, there is shown a temperature sensitive measuring device 10 in the form of a Wheatstone bridge. The resistance bridge 10 of FIG. 1 is a component of a pressure transducer which would also include a diaphragm or the like which subjects the bridge to compressive and tensile stresses. The bridge circuit, which is commonly known as a diffused semiconductor strain gage, has four resistor elements R which respond to changes in the sensed pressure by corresponding changes in resistance. Current is supplied to the bridge 10 via terminals 12 and 14 and the signal output is the voltage difference between taps 16 and 18. When the pressure acting upon the diaphragm is increased resitances adjacent the upwardly pointing arrows increase in value and resistances adjacent the downwardly pointing arrows decrease in value. The converse occurs when pressure is decreased.

Figure 2:
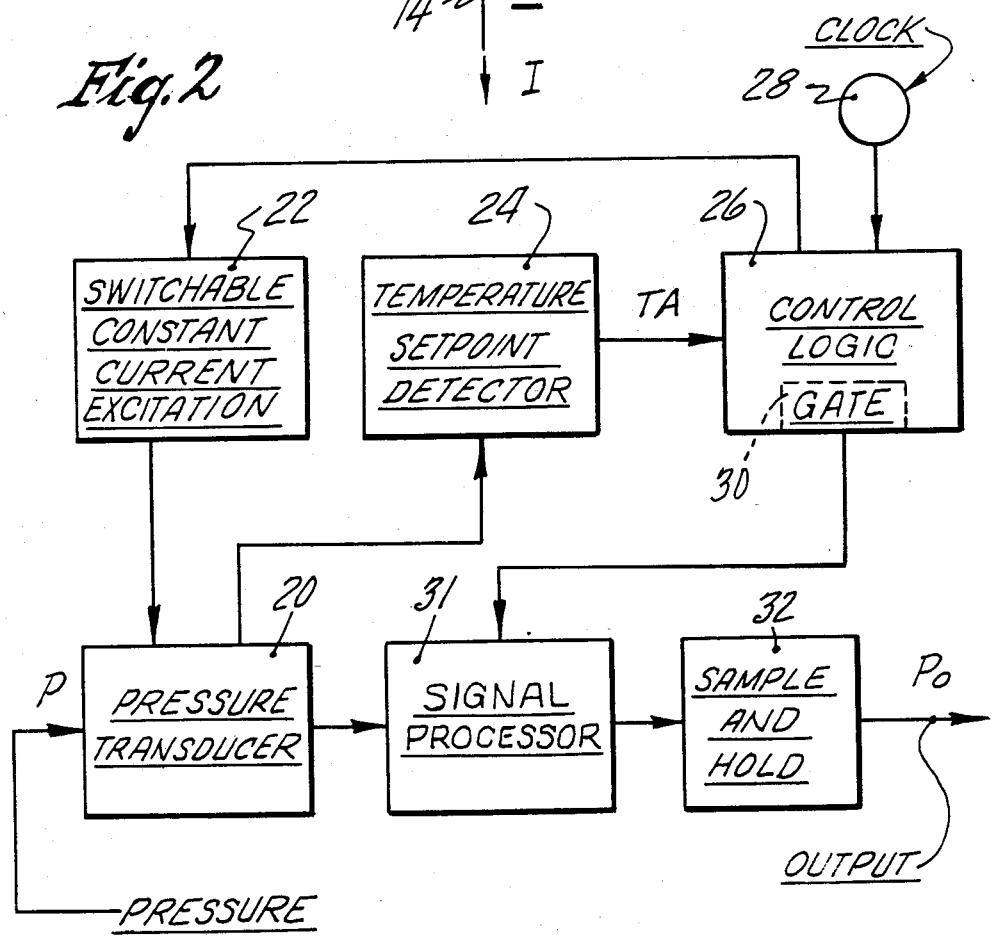
FIG. 2 is a block diagram of a preferred transducer control system of the invention.

FIG. 2 illustrates a preferred form of control circuit for the bridge 10 which attempts to maintain the bridge at a predetermined temperature when readings are taken. A pressure transducer 20, which incorporates the bridge 10, is exposed to a pressure which is to be measured. A constant magnitude current source 22 directs constant current pulses through the transducer 20 causing it to heat up to a predetermined temperature which is detected by a temperature set point detector 24. The output TA of the temperature setpoint detector 24 is applied to a control logic circuit 26 which also receives pulses from a clock 28 as an input. As shown in FIG. 2, the control logic circuit 26 controls the constant current source 22 and also includes a gate 30 which allows a sample and hold circuit 32 to receive the output of the pressure transducer 20 via a signal processor 31. The analog output $P_o$ of sample and hold network 32 may be applied, after conditioning, to a digital computer for controlling an aircraft gas turbine engine (not shown).

Figure 3:
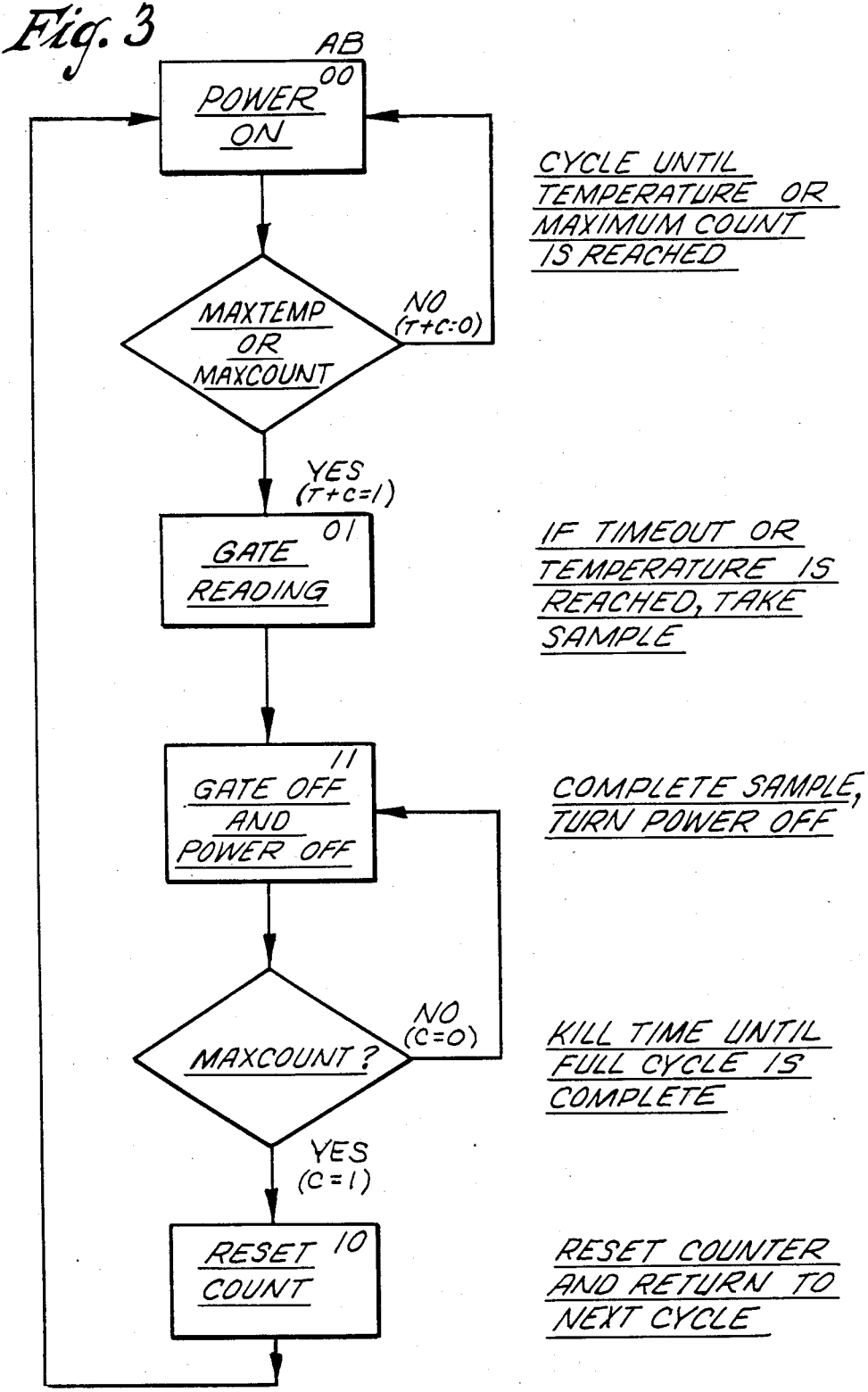
FIG. 3 is a flow chart showing the method of transducer control effectuated by the system of FIG. 2.

The method of the invention is outlined in the flow chart of FIG. 3. Initially, power is applied to the transducer at the leading edge of a clock pulse and is continuously maintained until the gate 30 is shut off, whereupon power is simultaneously shut off (See FIG. 5). Should a predetermined temperature be reached or a maximum predetermined number of clock pulses be counted, the gate 30 will enable a reading of pressure to be received by the sample and hold network 32 when power is on. The gate will then close and power will be simultaneously shut off. The count will be reset to zero when the power is off and the maximum count has been achieved. It should be noted that, in the flow chart, the numbers in the upper right hand corners of the blocks represent the output logic states of two bistable memory units or flip flops A and B and that the letter T stands for the predetermined temperature and the letter C stands for maximum predetermined count.

Figure 4:
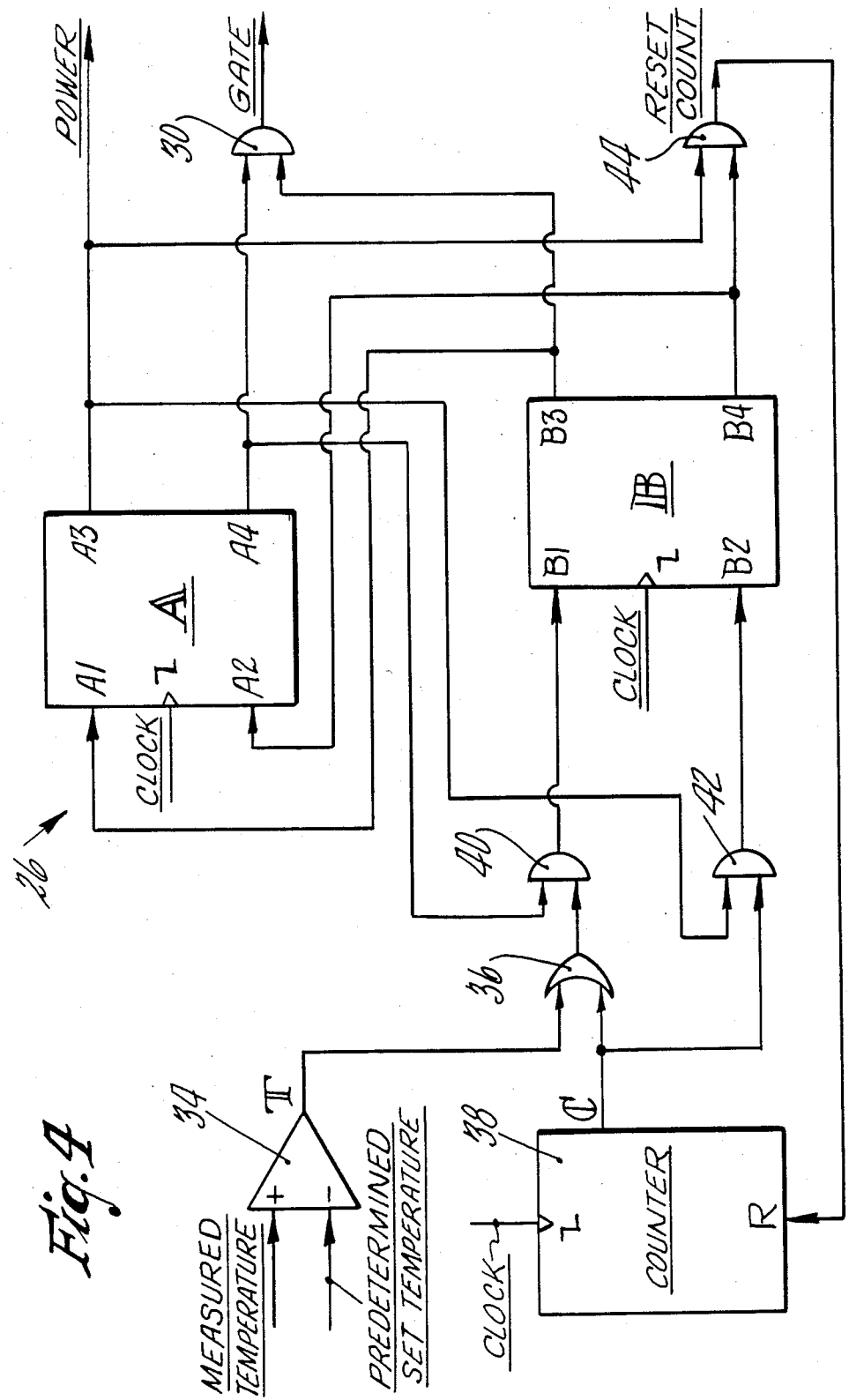
FIG. 4 is a schematic diagram of a preferred form of control logic for the system of FIG. 2.

Logic circuit 26 is depicted in a preferred form in FIG. 4. A comparator 34 receives inputs indicative of a predetermined threshold temperature and the actual transducer temperature. When the two aforementioned temperatures are equal comparator 34 will generate a high level logic signal, i.e., a logic 1 signal, to an OR gate 36. OR gate 36 also receives as an input a low level logic signal, i.e., a logic 0, if a maximum count C has not been attained by a counter 38, which is the most significant bit of a binary overflow counter of at least six bit capacity. The output count signal of counter 38 (MSB count signal) will constitute a logic 1 when the counter has overflowed because the maximum count C has been reached. Clock pulses to be counted are supplied to counter from the clock 28.

The output of OR gate 36, which is a logic 1 if both or one of the inputs are a logic 1, is applied to an AND gate 40 which also has a logic signal applied thereto indicative of whether a certain input is applied to the gate 30, which gate controls the readings of pressure. The output of AND gate 40 is a logic 1 only when the power is on and either the counter has overflowed and/or the predetermined temperature has been attained. A second AND gate 42 receives as inputs the MSB count signal and also a logic signal indicative of whether or not power is on (i.e., a logic 0 when power is on and a logic 1 when power is off).

As shown in FIG. 4, logic circuit 26 embodies two bistable memory units or JK type flip flops A and B which have input terminals A1, A2 and B1, B2, respectively. Memory units A and B also have respective output terminals A3, A4 and B3, B4. It should also be noted that the memory units A and B have clock pulses applied thereto so as to change state upon the leading edges of clock pulses when appropriate inputs are present. As to the memory units A and B shown herein, these units will be considered reset when their output signals at A3 and B3 are at a logic 0.

The outputs of the AND gates 40 and 42 are respectively applied to memory inputs B1 and B2 of unit B whereas the memory outputs B3 and B4 of unit B are respectively applied to memory inputs A1 and A2 of unit A. In addition, it will be seen that the output of A3 controls the power and that the output of A4 is an input to the gate 30 (which is an AND gate). Moreover, the output at B3 is the second input to AND gate 30. Yet another AND gate 44 receives the outputs of A3 and B4 for generating a reset count control signal to counter 38.

When the predetermined temperature is achieved, a logic 1 is applied to setting terminal B1 causing the output at B3 to go from a logic 0 to a Logic 1. Obviously such an occurrence results in the gate 30 being enabled since a logic 1 was previously directed thereto as power was being applied. The gate 30 then generates an output commanding pressure readings. However, since the logic 1 signal from output B3 is also applied to the setting terminal A1 of memory unit A, the output at A3 goes to logic 1 and the output at A4 goes to logic 0 at the leading edge of the next clock pulse. The change of state at terminals A3 and A4 respectively cause the power to be shut off and the pressure reading AND gate 30 to be disabled.

With power off, a logic 1 is directed to AND gate 42 which now awaits a logic 1 MSB count signal indicating the attainment of count C. When the logic 1 MSB signal arrives, AND gate 42 is enabled, thereby generating a logic 1 resetting pulse to memory unit B. This latter event causes the B3 and B4 outputs to assume logic states 0 and 1, respectively. As a consequence of this change of state, a logic 1 is applied to the resetting terminal A2 of memory Unite A, thereby causing a power on logic 0 signal to appear on terminal A3 upon the next clock pulse and a logic 1 signal to appear at an input to the pressure reading AND gate 30. Gate 30 is, of course, disabled because of the logic zero generated at terminal B3 of memory unit A.

The reset count control gate 44 will be enabled to reset the counter 38 only when a power off logic 1 appears at terminal A3 of memory unit A and a logic 1 appears at terminal B4 of memory unit B. It should be noted that as long as power is on, the counter will not be reset and the MSB count signal will be a steady voltage representing a logic 1.

Figure 5:
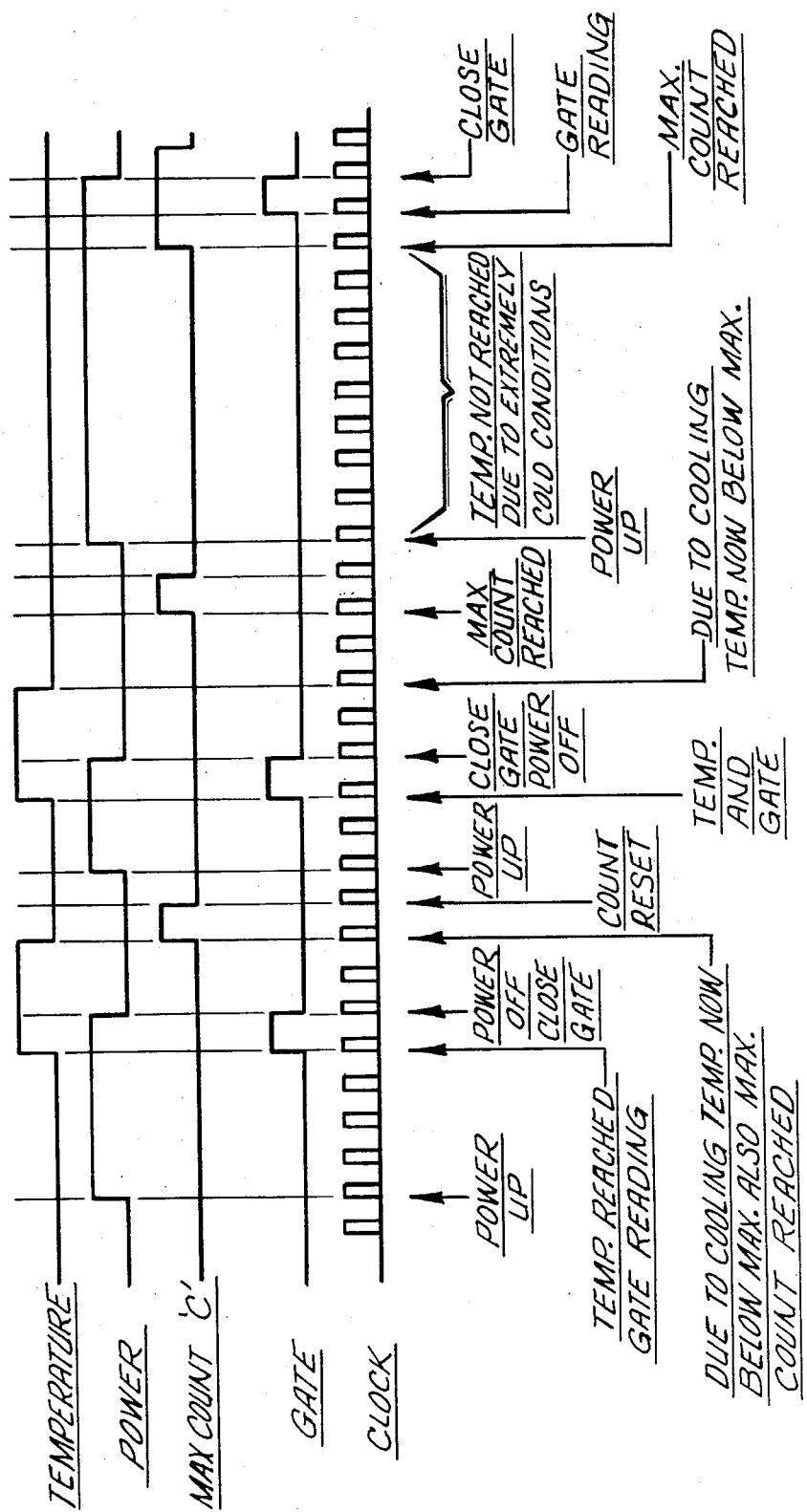
FIG. 5 is a timing diagram for the system of FIG. 2 and the method of FIG. 3.

The timing diagram of FIG. 5 should be a useful aid in understanding operation of the previously described logic circuit. From FIG. 5, it will be observed that at the first illustrated pulse from pressure reading AND gate 30 occurs when power is on and the predetermined temperature has been attained. In addition, it will be noted that this pulse terminates at the leading edge of the succeeding clock pulse in a simultaneous manner with the power pulse. Thereafter, the diagram of FIG. 5 shows the transducer cooling to below the predetermined temperature at the same time the MSB count signal is being generated. In the latter condition with power down, no pressure reading signal is generated by AND gate 30. The first depicted MSB pulse terminates as the counter 38 is reset at the leading edge of the next clock pulse and power is applied at the leading edge of the succeeding clock pulse.

The next pressure reading signal form AND gate 30 occurs upon the predetermined temperature being reached for the second time with power on, but it will be seen that no gate reading signal is generated by AND gate 30 upon generation of the second MSB pulse since power is off. However power is subsequently turned on; and although the predetermined temperature is not attained (due to extremely cold conditions), a signal from pressure reading AND gate 30 is produced one clock cycle after generation of the MSB count signal. Power then is terminated simultaneously with the gate signal and the counter 38 is reset at the leading edge of the next clock pulse.

Figure 6:
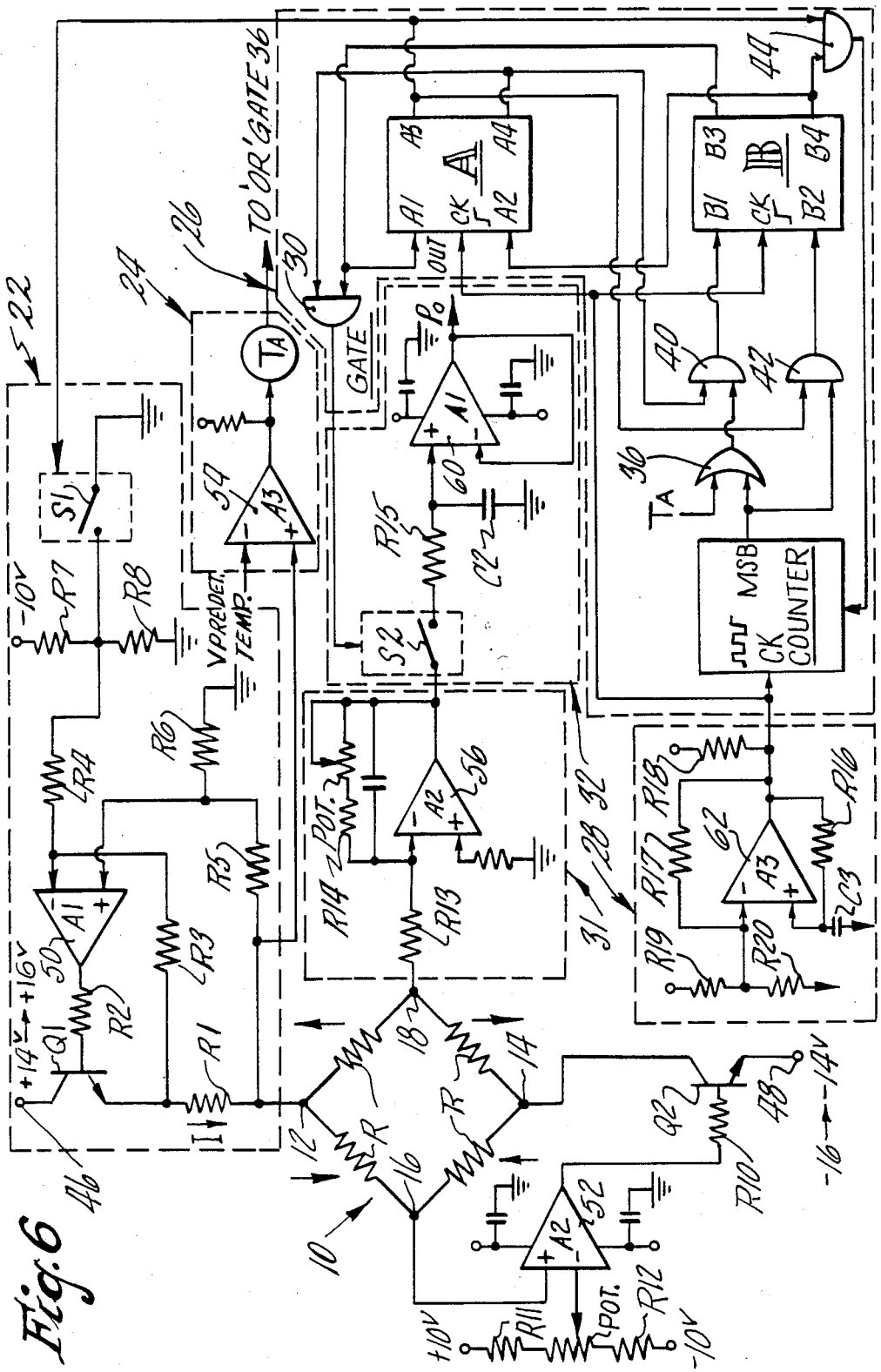
FIG. 6 is a schematic diagram of the system depicted in FIG. 2.

As shown in FIG. 6, the resistance bridge 10 is disposed in a series circuit comprising respective sources of positive and negative potential at terminals 46 and 48, a current sensing resistor R1 and transistors Q1 and Q2. The current I through the current sensing resistor R1 (and through bridge 10) is maintained at a constant value or magnitude by holding a constant potential difference thereacross. This regulation of the voltage drop across R1 is effected by modulating the resistance of the transistor Q1, the modulation being carried out by an operational amplifier 50 having an output resistance R2. The inverting input thereof is connected to a first voltage divider constituted by resistances R3 and R4 and the non-inverting input is connected to a second voltage divider constituted by resistances R5 and R6. The first voltage divider is connected to the positive end of resistance R1 whereas the second voltage divider is connected to the negative end of R1. The other terminal of the first voltage divider is referenced to a source of negative potential supplied by a voltage divider of resitances R7 and R8 when power is on and a source of ground potential when an analog switch S1 is closed by a logic 1 (power off) signal form terminal A3 of memory unit A. The other terminal of the second voltage divider is grounded.

When switch S1 is actuated (i.e. opened), amplifier 50 renders transistor Q1, conductive and the resistance thereof is modulated so as to hold a constant voltage drop (and hence a constant current I) across the resistor R1. The voltage at terminal 16 of bridge 10 is maintained at zero or ground potential by an operational amplifier 52 with an output resistor R10. Amplifier 52 has its inverting input connected to a a zero voltage point on a voltage divider constituted by R11, a potentiometer and R12 and its non-inverting input connected to the terminal 16. When S1 closes due to a logic 1 power off signal at terminal A3 of unit A, both inputs to amplifier 50 see ground, thereby rendering Q1, non-conductive.

The voltage at terminal 12 will, because of the constant current, be a function of bridge temperature since bridge resistance is a function of temperature. The voltage at terminal 12 is directed to the non-inverting input of a comparator 54 which has an inverting voltage input corresponding to predetermined temperature or set temperature. When the predetermined set temperature voltage is equaled by the voltage indicative of actual bridge temperature, the comparator 54 yields an output signal TA which is received by the OR gate 36.

Because the voltage at terminal 16 is essentially maintained at zero or ground by transistor Q2, the voltage at terminal 18 is representative of pressure P. To this end, the voltage at terminal 18 is applied to the inverting input of a low pass filter amplifier 56, which constitutes part of the signal processor 31, through resistor R13. The non-inverting input thereof is referenced to ground. A potentiometer to adjust gain and register R14 are embodied in the feedback loop of amplifier 56 together with a capacitor C1 in parallel therewith. The output of amplifier 56 is applied, via switch S2, to a well-known sample and hold circuit comprising input resistor R15, capacitor C2 and operational amplifier 60. The output voltage of the amplifier 60 is, of course, representative of pressure. As best seen in FIG. 6, the operation of pressure reading switch S2 of the sample and hold circuit 32 is controlled by the pressure reading AND gate 30.

Clock 28 may take the form of an oscillator defined by comparator 62, feedback resistors R16 and R17, supply resistor R18 and a voltage divider formed by resistors R19 and R20. Capacitor C3 alternatively charges through resistors R18 and R16 until the non-inverting input is sufficient to change the comparator output. Upon a change in output capacitor C3 discharges through resistor R16 to a level to cause the output to switch state. Successive charges and discharges result in a square waveform of constant frequency.

The specific electronic control circuitry illustrated in FIG. 6 includes as principal components two integrated circuits (IC's) respectively having two dual operational amplifiers A1, and A2 an IC having dual comparators A3, an IC having dual JK flip flops, an IC having OR gates, an IC having a dual analog switch and an IC having a quad AND gate. Although a specific logic circuit has been described herein, those skilled in the art will appreciate that all its functions could be easily carried out by a computer and that the programming thereof could be accomplished in a facile manner. Hence, the disclosed logic circuit represents just one way of turning on power and taking readings. In addition, the analog circuit admits of many variations.

Obviously many other modifications and variations are possible in light of the above teachings without departing from the scope or spirit of the invention as defined in the appended claims.

I claim:

1. A control circuit for a transducer having an output comprising:

a current regulator for directing pulses of current through the transducer;

a sensing circuit operatively connected to the transducer to measure a potential at a reference point in the transducer which is indicative of transducer temperature and provide a temperature signal commensurate therewith if the transducer temperature is equal to a predetermined temperature; and an output reading circuit operatively connected to the transducer for sensing the transducer output when the transducer is at the predetermined temperature and generating a signal indicative of the transducer output.

2. The control circuit of claim 1, wherein the current regulator comprises:

means to hold the current pulses at a constant amplitude throughout their duration.

3. The control circuit of claim 2, wherein the current regulator comprises:

a power switch actuable to initiate and terminate each of the pulses.

4. The control circuit of claim 3, further comprising;

a logic circuit for actuating the power switch.

5. The control circuit of claim 4, wherein the output reading circuit comprises:

first means for sensing another potential and generating a first output;

second means to receive and hold the first output for generating the signal indicative of the transducer output; and reading switch means to transmit the first output to the second means.

6. The control circuit of claim 5, wherein the logic circuit further comprises:

actuating means responsive to the temperature signal to actuate the reading switch means.

7. The control circuit of claim 6, wherein the actuating means of the logic circuit comprises:

means to actuate the reading switch means during a current pulse in the absence of the temperature signal after a predetermined time interval.

8. A control circuit for a transducer having an output comprising:

power means to direct a current of constant magnitude through the transducer;

power switch means actuable to turn the constant magnitude current on and off;

sensing means to sense the temperature of the transducer and generate a temperature signal when the transducer temperature is of a predetermined value;

reading means to read the output of the transducer and provide a transducer output signal; and logic means responsive to the temperature signal to periodically actuate the power switch means to turn the constant current on and off and to control the reading means such that the reading means reads the output when the transducer temperature is of the predetermined value.

9. The control circuit of claim 8, wherein the logic means comprises:

means to periodically generate a count signal indicative of a predetermined period;

means responsive to the count signal to activate the power switch means to turn the constant magnitude current on; and means responsive to the temperature signal to activate the reading means and to simultaneously deactivate the reading means and the power switch means.

10. A method of obtaining accurate output signals from a power consuming temperature sensitive transducer comprising:
  periodically directing current pulses of constant magnitude through the transducer;
  determining when the transducer temperature has attained a predetermined value; and
  obtaining an output signal from the transducer when the temperature attains the predetermined value.

11. The method of claim 10, further comprising:
  obtaining another output signal from the transducer periodically when the temperature is below the predetermined value.

12. The method of claim 11, wherein the periodic directing of current pulses comprises:
  periodically turning current on; and
  turning off current after either of the output signals has been obtained.

13. The method of claim 11 further comprising:
  generating a timing signal; and wherein the said obtaining of another output signal occurs when the timing signal is present.

* * * * *